ns Patent Number: 6,083,446
Date of Patent: Jul. 4, 2000

[54] PROCESS FOR PRODUCING A MULTI-COLORED THERMOPLASTIC PLASTICS FOIL, AND A MULTI-COLORED THERMOPLASTIC PLASTICS FOIL

[75] Inventors: Konrad Eysel, Kuchen; Lothar Bargiel, Uhingen; Dieter Reichert, Salach; Johannes Pröpper, Eislingen, all of Germany

[73] Assignee: Banecke-Kaliko AG, Hannover, Germany

[21] Appl. No.: 09/043,111

[22] PCT Filed: Oct. 18, 1996

[86] PCT No.: PCT/DE96/01999

§ 371 Date: Jun. 12, 1998

§ 102(e) Date: Jun. 12, 1998

[87] PCT Pub. No.: WO97/15429

PCT Pub. Date: May 1, 1997

[51] Int. Cl.[7] .............................. B29C 31/06; B28B 1/02; B32B 27/04

[52] U.S. Cl. .......................... 264/302; 264/310; 428/407

[58] Field of Search ................................ 428/321.5, 407; 106/230, 272, 400; 264/40.6, 302, 310

[56] References Cited

U.S. PATENT DOCUMENTS

| | | | |
|---|---|---|---|
| 3,079,644 | 3/1963 | Molitor et al. | 264/246 |
| 3,253,068 | 5/1966 | Whittington | 264/73 |
| 3,773,535 | 11/1973 | Burgyan et al. | 106/298 |
| 4,740,337 | 4/1988 | Gale et al. | 264/40.6 |

FOREIGN PATENT DOCUMENTS

| | | |
|---|---|---|
| 0 176 274 A2 | 4/1986 | European Pat. Off. . |
| 2 564 772 | 11/1985 | France . |
| 3637524 A1 | 5/1988 | Germany . |
| 2 082 108 | 3/1982 | United Kingdom . |

OTHER PUBLICATIONS

Saffert, Reinhard, "Armaturenbrett–Fertigung nach der PVC–Powder–Slush–Technologie", FACHBETTRAG, 279 Kunststoffberater 31 (1986) Jul./Aug., Nos. 7–89, Isenhagen (Hannover), W. Germany.

Primary Examiner—William Krynski
Assistant Examiner—Dawn L. Garrett
Attorney, Agent, or Firm—Pillsbury Madison & Sutro LLP

[57] ABSTRACT

The invention concerns a process for producing multi-colored plastics, in which slush material is introduced into a mold which can be heated and rotated and has a molding surface. The colorant material comprises a plurality of coloring elements consisting of a colorant content and a transparent plastics cover surrounding the latter or a plastics matrix holding the colorant content together. The colorant content is left in the plastics casing or matrix during sintering and gelling.

13 Claims, 1 Drawing Sheet

PROCESS FOR PRODUCING A MULTI-COLORED THERMOPLASTIC PLASTICS FOIL, AND A MULTI-COLORED THERMOPLASTIC PLASTICS FOIL

The invention relates to a process for producing a multicolored thermoplastic film according to the definition of the species of claim 1 and a multi-colored thermoplastic film according to the definition of the species of claim 10.

German Patent No. 3,637,524 C2 describes a multi-colored thermoplastic film consisting of a monochromatic base material and a differently colored admixture. The differently colored admixture consists of particles which are considerably larger than pigments and have an approximately spherical shape. At the softening point of the base material, the differently colored admixtures are solid or at least considerably more viscous than the base material. In addition, the differently colored admixture is also smaller than the film wall thickness, so that the geometric shape of these particles remains essentially unchanged. This yields a mottled color effect in such films.

It is known from the publication *Kunststoffberater* [Plastics Adviser], Jul. 8, 1968, "Manufacturing Dashboards by the PVC Powder Slush Technology," Dr. R. Saffert, pages 51 to 53, which is the generic prior art, that slush membranes can be colored with pigments. It is also mentioned there that the pigments are not broken up quite as well by the sintering process as by calendering.

European Patent No 176,274 A2 discloses a three-dimensional multi-colored plastic body and a method of producing same by powder slush technology. The base material used consists of particles with a transparent core of plastic and an outer shell comprising colored pigments.

U.S. Pat. No. 3,253,068 A discloses a method and a device for producing decorative hollow balls. Colored chips in the manner of a mosaic are bonded using plastic as the binder to form the shell of the ball.

British Patent No. 2,082,108 A likewise relates to a method of producing balls and the product produced by that method. Balls and powder are placed in a slush mold here and gelled. Metal strips may also be added to achieve decorative effects.

It is also known that a monochromatic film can be printed in color. However, this yields a repeat in the pattern because of the finite extent of the printing roll. Since the color is applied only to the surface, this film is also sensitive to abrasion.

The abrasion sensitivity is also a problem with slush membranes with colored admixtures. The slush process does not prevent concentrations of color from also developing at the surface. Then they are not protected from abrasion.

The object of the present invention is to improve on a method of producing multi-colored plastic films by the slush method and the multi-colored plastic films produced by the slush method to the extent that the plastic films are reliably protected from abrasion of colored components.

With a method according to the definition of the species of claim 1 and with a plastic film according to the definition of the species of claim 10, this object is achieved by the features given in the characterizing part of the respective claim.

When the colorant material and the colorless or uniformly monochromatic plastic base material forming the slush material are hot-sintered after mixing incompletely, rotating the mold for the purpose of uniformly distributing the slush material on the surface of the mold and thus achieving a constant film thickness causes only a slight further mixing of the plastic base material and the colorant material, because the mixing cycle is ended very early due to the gelation which occurs on heating. The random local concentration distribution always leads to films with different colored designs, i.e., so-called originals.

To prevent abrasion of color when the color concentrations are on or near the surface of the film, the colorant is not introduced in pure form, but instead as a plurality of coloring elements consisting of a colorant content and a transparent plastic shell around the colorant. The colorant content is thus encapsulated by the plastic shell and is thus protected. During sintering and gelling, the colorant content is left in the plastic shell. The finished product thus has the property of resisting abrasion of color.

The plastic shell may be used as a material with a higher melting point than the plastic base material. As an alternative or in addition, a crosslinked material may be used for the plastic shell. These measures ensure that the encapsulating or fixative properties of the plastic shell are reliably maintained in hot-sintering. Polypropylene, polyethylene, polyamide, polyester polyacetal, polyacrylic, polyacrylonitrile, polyurethane, epoxy resin, EPDM (ethylene propylene diene monomer), POM (poly(oxy methylene)) or PVC (polyvinyl chloride) may be used as the material for the plastic shell and/or the plastic base material. The choice can also be made on the basis of hardness, softening point, recyclability, crosslinkability, availability, acquisition cost and coordination of melting points of the plastic base material on the one hand and the plastic shell on the other hand.

To influence the appearance of the films through the type and form of the colorant material, the colorant content may consist of fibers, agglomerates, i.e., adhesive-bonded colorant particles or pigments, spherical concentrates, i.e., particles of sprayed paint solutions or powders grown to a spherical shape, including a combination of two or more or all or these forms. Organic, inorganic or metallic colors are suitable types of colors.

When using multiple colors, the coloring elements may be added separately according to colors or mixed. There is the possibility of thoroughly mixing the coloring elements of one or more origins together before adding them to produce a mixed color composed of primary colors.

Furthermore, the degree of mixing can be influenced by the time of addition of the colorant material to the plastic base material.

BRIEF DESCRIPTION OF DRAWINGS

The invention is explained in greater detail below on the basis of three embodiments which are illustrated in the figures, which show.

A multi-colored thermoplastic film is produced by the essentially known slush method, wherein slush material is fed into a heatable mold, said mold is subsequently rotated so that the slush material is distributed on the surface of the mold, then sintered and gelled by heating. The slush material can first be prepared in a mixer by mixing plastic base material of one or more components and adding colorant material just before the end of the mixing operation, so that it is mixed only incompletely with the plastic base material. The resulting slush material is then fed into the heatable mold and sintered.

In addition, it is also possible to add plastic base material and colorant material to the mold without mixing and then sinter, whereupon a certain mixing occurs due the rotation.

The advantage of hot-sintered films, i.e., films produced by the slush method, in comparison with deep-drawn films is that they are free of stresses. Geometric samples therefore retain their original shape and are not distorted by deep drawing.

Figure 1:
FIG. 1: a surface view of a plastic film with a leathery structure and metallic colorant content produced by the present method.

FIG. 1 shows an enlarged view of the surface of a film sintered in the form of a leathery structure. The plastic base material was a uniformly black colored material into which was incorporated a small amount of colorant material of coloring elements with metallic colorant content. A refined metallic effect was achieved in this way.

Figure 2:
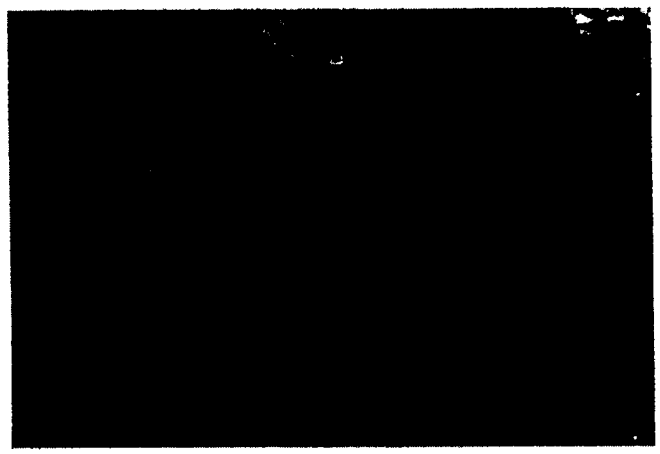
FIG. 2: a surface view of a plastic film with colorant content in fiber form and powder form, produced by the present method.
Figure 3:
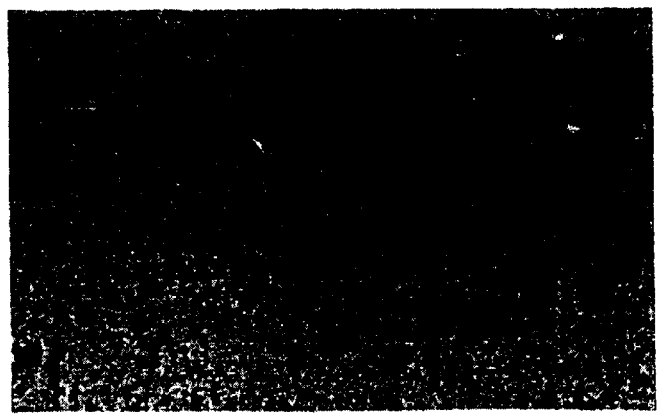
FIG. 3: a surface view of a plastic film with colorant content in powder form produced by the present method.

FIG. 2 shows the surface of a film on an enlarged scale, comprising a gray plastic base material with coloring elements containing both lighter and darker colorants. The lighter colorant content has a fibrous shape, while the darker colorant content is in powdered form.

The surface of the film according to FIG. 2 also shows a gray plastic base material. Only coloring elements containing dark powdered colorant were used as the colorant material. The concentration of coloring elements differs greatly here.

What is claimed is:

1. A process for producing a multi-colored thermoplastic film by placing slush material of a colorless or uniformly monochromatic plastic base material and a colorant material mixed incompletely with the former in a heatable and rotatable mold with a mold surface, the mold is heated to a mold temperature and rotation is started, so that the slush material is distributed and deposited on the mold surface, the slush material is then sintered and gelled, and said thermoplastic film is un-molded after cooling wherein the colorant material is supplied in the form of a plurality of coloring elements which consist of a colorant content and a transparent plastic shell surrounding the colorant content, and the colorant content is left in the plastic shell during sintering and gelling.

2. A process according to claim 1, wherein a material with a higher melting point than the plastic base material is used for the plastic shell.

3. A process according to claim 1 or 2, wherein a crosslinked material is used for the plastic shell.

4. A process according to claim 1, wherein: polypropylene, polyethylene, polyamide, polyester, polyacetal, polyacrylic, polyacrylonitrile, polyurethane, epoxy resin, EPDM (ethylene propylene diene monomer), POM (poly(oxy methylene)) or PVC (polyvinyl chloride) is used as the material for the plastic shell and/or the plastic base.

5. A process according to claim 1, wherein fibers, agglomerates, spherical concentrates or powders are used for the colorant content.

6. A process according to claim 1, wherein organic, inorganic or metallic colors are used for the colorant content.

7. A process according to claim 1, wherein the coloring elements are added to the plastic base material outside the mold.

8. A process according to claim 1, wherein the coloring elements and the plastic base material are added to the mold at the same time or one after the other before heating and rotating the mold.

9. A process according to claim 1, wherein in the coloring elements are added after the plastic base material has been fed into the mold, and the mold has been heated and rotated.

10. A multi-colored thermoplastic film of a colorless or uniformly monochromatic plastic base material and an additional colorant material which is produced by a hot sintering method in a heatable and rotatable mold according to claim 1 after incomplete mixing of the plastic base material and colorant material, wherein the colorant material comprises a plurality of coloring elements consisting of a colorant content and a transparent plastic surrounding the colorant content.

11. A multi-colored thermoplastic film according to claim 10, wherein the plastic shell has a higher melting point than the plastic base material.

12. A multi-colored thermoplastic film according to claim 10 or 11, wherein the plastic shell is a crosslinked material.

13. A multi-colored thermoplastic film according to claim 10, wherein the plastic shell and/or the plastic base material is made of polypropylene, polyethylene, polyamide, polyester, polyacetal, polyacrylic, polyacrylonitrile, polyurethane, epoxy, EPDM (ethylene propylene diene monomer), POM (poly(oxy methylene)) or PVC (polyvinyl chloride).

* * * * *